L. F. LIESER.
CIRCULAR RING GAGE.
APPLICATION FILED JULY 1, 1913.
1,199,284.
Patented Sept. 26, 1916.
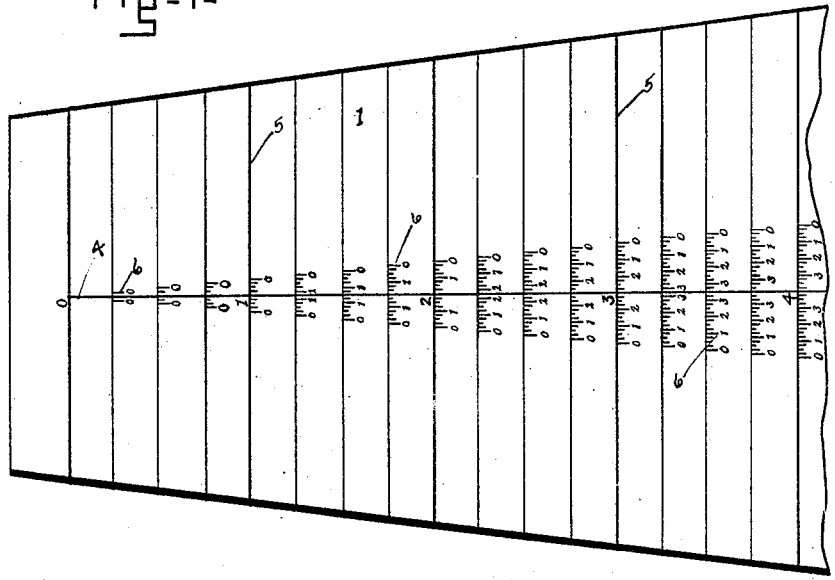
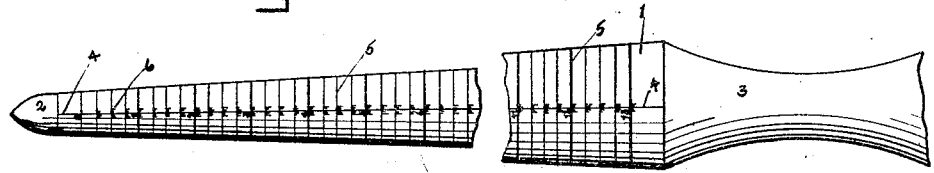
Witnesses
D. E. Miller
F. J. Phillips
Inventor
Leo F. Lieser
By Geo. P. Kimmel,
Attorney

UNITED STATES PATENT OFFICE.

LEO F. LIESER, OF McKEESPORT, PENNSYLVANIA.

CIRCULAR RING-GAGE.

1,199,284.  Specification of Letters Patent.  Patented Sept. 26, 1916.

Application filed July 1, 1913. Serial No. 776,801.

*To all whom it may concern:*

Be it known that I, LEO F. LIESER, citizen of the United States, residing at McKeesport, in the county of Allegheny and State of Pennsylvania, have invented certain new and useful Improvements in Circular Ring-Gages, of which the following is a specification.

This invention relates to improvements in gages and more specifically to circular ring gages.

The object of my invention is to provide a ring gage which may be used not only for determining the exact size of a ring, but more especially the exact portion of a ring which must be removed in order to reduce the ring to a given size, resulting in accuracy and the saving of considerable time in making rings of the proper size.

With the above and other objects in view, my invention consists in the combination, arrangement, and details of construction disclosed in the drawings and specification, and then more particularly pointed out in the appended claim.

Referring to the drawings, wherein similar reference characters designate similar parts throughout the respective views: Figure 1 is a fragmental detail view of my circular ring gage enlarged and laid flat, while Fig. 2 is a side elevation of the same.

Referring to the drawings, which are merely illustrative of my invention, 1 designates the metal casing or tube portion of the preferred type of my ring gage, while 2 is the core thereof which terminates in a handle 3. Said tube 1 is tapering and has marked or stamped thereon a chart so scaled as to gage the size of rings, said scale comprising a line 4 running the length of said tube, said line 4 being divided by parallel lines 5 spaced apart, disposed at right angles to said line 4, and running around the tube portion 1, and are so numbered as to indicate the size of a ring at the respective lines 5. My novelty lies in the marking and numbering as a part of said scale and upon each of said lines 5 to the right and to the left of said line 4, of predetermined spaces 6, to indicate the preceding smaller sizes to which a ring may be reduced. This is accomplished with my gage by slipping the ring over the tube to the point where it fits the gage. This indicates the present size of the ring. The ring is then marked to the right and to the left of the line 4 at the number or mark which indicates the size to which the ring is to be reduced. By severing the ring at the points thus marked, removing the portion thus cut out, and again pressing the ends of the severed ring together, the ring will be found to fit the gage at the exact size to which it was to be reduced.

Having now described and pointed out the new and useful features of my invention, I do not limit myself to the shape and size of certain parts where shape and size are not essential, nor do I restrict myself to the exact details of construction shown and described, but mean and intend to claim all equivalents and variations thereof not departing in principle from my invention and falling within the purview of the appended claim.

I claim as my invention:

A device of the kind described, comprising a tapering body portion, a measuring scale marked on said body portion, said scale comprising a line extending along the length of said body portion, a plurality of circumferentially extending lines spaced apart along the length of said body portion, and a plurality of dissecting marks spaced apart upon said circumferentially extending lines and upon both sides of said first mentioned line, excepting only the first circumferential line nearest the smaller end of said tapering body portion.

In testimony whereof I affix my signature in presence of two witnesses.

LEO F. LIESER.

Witnesses:
 A. L. GOLDSTROM,
 L. D. DAVIS.